(12) United States Patent
Moskala et al.

(10) Patent No.: US 7,030,181 B2
(45) Date of Patent: Apr. 18, 2006

(54) FILMS PREPARED FROM PLASTICIZED POLYESTERS

(75) Inventors: Eric Jon Moskala, Kingsport, TN (US); Kevin Douglas Horton, Surgoinsville, TN (US); Rodney Layne Piner, Kingsport, TN (US); John Walker Gilmer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 588 days.

(21) Appl. No.: 10/086,905

(22) Filed: Feb. 28, 2002

(65) Prior Publication Data

US 2003/0060546 A1    Mar. 27, 2003

Related U.S. Application Data

(60) Provisional application No. 60/282,996, filed on Apr. 11, 2001.

(51) Int. Cl.
  *C08K 5/10* (2006.01)
  *C08L 67/00* (2006.01)
  *B32B 3/00* (2006.01)

(52) U.S. Cl. .................. 524/287; 524/289; 524/293; 264/175; 264/176.1; 264/212; 264/291

(58) Field of Classification Search ............. 524/287, 524/289, 293, 601; 264/175, 176.1, 212, 264/291
See application file for complete search history.

(56) References Cited

U.S. PATENT DOCUMENTS

| | | |
|---|---|---|
| 2,012,267 A | 8/1935 | Carothers |
| 2,044,612 A | 6/1936 | Jaeger |
| 3,186,961 A | 6/1965 | Sears |
| 3,658,978 A | 4/1972 | Ancker |
| 3,873,496 A | 3/1975 | Hills |
| 3,883,478 A | 5/1975 | Gresham |
| 4,045,431 A | 8/1977 | Fagerburg |
| 4,258,153 A | 3/1981 | Yomamoto et al. |
| 4,340,526 A | 7/1982 | Petke et al. |
| 4,391,938 A | 7/1983 | Memon et al. |
| 4,450,250 A | 5/1984 | McConnell et al. |
| 4,506,043 A | 3/1985 | Ogawa et al. |
| 4,814,426 A | 3/1989 | Utsumi et al. |
| 4,837,254 A | 6/1989 | Branscome |
| 4,873,270 A | 10/1989 | Aime et al. |
| 4,963,418 A | 10/1990 | Isaka et al. |
| 4,996,291 A | 2/1991 | Yoshinaka et al. |
| 5,017,680 A | 5/1991 | Sublett |
| 5,256,714 A | 10/1993 | Liu et al. |
| 5,290,631 A | 3/1994 | Fleury et al. |
| 5,399,595 A | 3/1995 | Sublett et al. |
| 5,484,632 A | 1/1996 | Mercer, Jr. et al. |
| 5,489,470 A | 2/1996 | Noda |
| 5,498,692 A | 3/1996 | Noda |
| 5,502,116 A | 3/1996 | Noda |
| 5,532,049 A | 7/1996 | Masuda et al. |
| 5,534,570 A | 7/1996 | Shih et al. |
| 5,536,564 A | 7/1996 | Noda |
| 5,589,126 A | 12/1996 | Shih et al. |
| 5,602,227 A | 2/1997 | Noda |
| 5,618,855 A | 4/1997 | Noda |
| 5,624,987 A | 4/1997 | Brink et al. |
| 5,654,347 A | 8/1997 | Khemani et al. |
| 5,696,176 A | 12/1997 | Khemani et al. |
| 5,703,160 A | 12/1997 | Dehennau et al. |
| 5,753,782 A * | 5/1998 | Hammond et al. ......... 525/450 |
| 5,824,398 A | 10/1998 | Shih |
| 5,859,116 A | 1/1999 | Shih |
| 5,900,322 A | 5/1999 | Buchanan et al. |
| 5,928,788 A | 7/1999 | Riedl |
| 5,958,581 A | 9/1999 | Khanarian et al. |
| 5,965,648 A | 10/1999 | Brink et al. |
| 5,998,005 A | 12/1999 | Kanno |
| RE36,548 E | 2/2000 | Noda |
| 6,025,061 A | 2/2000 | Khanarian et al. |
| 6,054,551 A | 4/2000 | Cornell et al. |
| 6,068,910 A | 5/2000 | Flynn et al. |
| 6,077,931 A | 6/2000 | Noda |

(Continued)

FOREIGN PATENT DOCUMENTS

DE    100 40 691 A1    2/2002

(Continued)

OTHER PUBLICATIONS

Anonymous Research Disclosure 23314, Sep. 1983.
Fox equation, T.G. Fox, Bull. Am. Phys. Soc., 1, 123 (1956).
"The Technology of Plasticizers", by J. Kern Sears and Joseph R. Darby, published by Society of Plastic Engineers/Wiley and sons, New York, 1982, pp 136-137.
Coleman et al., Polymer 31, 1187 (1990).
Database WPI, Section CH, Week 9702, XP-002106151, Derwent Publications, Ltd., Oct. 29,1996, London, GB.
Jim Butschli, Packaging World, pp. 26-28, Jun. 1997.

(Continued)

*Primary Examiner*—Tae H. Yoon
(74) *Attorney, Agent, or Firm*—Bernard J. Graves, Jr.; Eric D. Middlemas

(57) ABSTRACT

A film or sheet having a glass transition temperature below about 23° C. and a melting temperature greater than about 120° C. is prepared by first preparing a polyester composition of about 50 to about 95 weight percent of a base copolyester having a melting temperature of less than about 220° C. and exhibiting more than about 1 percent crystallinity after annealing for 2000 minutes at a temperature of which the base copolyester has a maximum crystallization rate; and about 5 to about 50 weight percent of a plasticizer suitable for use with the base copolyester. The polyester composition is formed into a film or sheet. During formation of the film or sheet or afterwards, crystallization is induced to provide a soft and flexible film or sheet.

45 Claims, 3 Drawing Sheets

U.S. PATENT DOCUMENTS

| | | | |
|---|---|---|---|
| 6,103,857 | A | 8/2000 | Jones et al. |
| 6,114,431 | A | 9/2000 | Lee et al. |
| 6,127,512 | A | 10/2000 | Asrar et al. |
| 6,160,199 | A | 12/2000 | Noda |
| 6,174,990 | B1 | 1/2001 | Noda |
| 6,231,970 | B1 | 5/2001 | Anderson et al. |
| 6,326,435 | B1 | 12/2001 | Takayama et al. |
| 6,350,530 | B1 | 2/2002 | Morikawa et al. |
| 6,482,872 | B1 | 11/2002 | Downie |
| 6,551,688 | B1 | 4/2003 | Moskala et al. |
| 6,551,699 | B1 | 4/2003 | Flynn |
| 6,569,990 | B1 | 5/2003 | Noda |
| 6,620,869 | B1 | 9/2003 | Asrar et al. |
| 6,632,390 | B1 | 10/2003 | Shelby et al. |
| 6,787,245 | B1 | 9/2004 | Hayes |
| 2001/0027225 | A1 | 10/2001 | Downie |
| 2002/0061944 | A1 | 5/2002 | Asrar et al. |
| 2003/0060542 | A1 | 3/2003 | Witt et al. |
| 2003/0145518 | A1 | 8/2003 | Noda et al. |
| 2003/0171471 | A1 | 9/2003 | Pritschins et al. |
| 2003/0187149 | A1 | 10/2003 | Schmidt et al. |
| 2003/0212244 | A1 | 11/2003 | Hayes et al. |
| 2004/0024101 | A1 | 2/2004 | Hayes |
| 2004/0024102 | A1 | 2/2004 | Hayes et al. |
| 2004/0039092 | A1 | 2/2004 | Asrar et al. |
| 2004/0068059 | A1 | 4/2004 | Katayama et al. |
| 2004/0127609 | A1 | 7/2004 | Strand et al. |
| 2004/0152810 | A1 | 8/2004 | Takenaka et al. |

FOREIGN PATENT DOCUMENTS

| | | |
|---|---|---|
| EP | 0 724 947 A1 | 8/1996 |
| EP | 0 744 439 A1 | 11/1996 |
| EP | 0 484 818 | 1/1997 |
| EP | 0 965 615 A1 | 12/1999 |
| EP | 1 054 038 A1 | 11/2000 |
| EP | 1 375 556 A2 | 2/2004 |
| EP | 1 529 808 A2 | 5/2005 |
| EP | 1 529 809 A1 | 5/2005 |
| GB | 805 586A A | 12/1958 |
| GB | 805 587 | 12/1958 |
| GB | 805 587 A | 12/1958 |
| GB | 805 588 | 12/1958 |
| GB | 805 588 A | 12/1958 |
| GB | 815991 | 7/1959 |
| GB | 1 323 478 | 7/1973 |
| JP | 1-138260 A | 5/1989 |
| JP | 1-49741 B2 | 10/1989 |
| JP | 8-142290 A | 11/1990 |
| JP | 10-291225 A | 11/1990 |
| JP | 4-62144 | 2/1992 |
| JP | 04 117432 | 4/1992 |
| JP | 2986197 B2 | 4/1992 |
| JP | 4-166309 | 6/1992 |
| JP | 5-271397 A | 10/1993 |
| JP | 7-60924 A | 3/1995 |
| JP | 7-278418 A2 | 10/1995 |
| JP | 08 283547 A | 10/1996 |
| JP | 8-283547 A | 10/1996 |
| JP | 9-40823 A | 2/1997 |
| JP | 9-66590 A2 | 3/1997 |
| JP | 9-217014 | 8/1997 |
| JP | 9-272191 A | 10/1997 |
| JP | 11-158358 A | 6/1999 |
| JP | 2-986197 | 10/1999 |
| JP | 11-343353 A | 12/1999 |
| JP | 2000-136294 A | 5/2000 |
| JP | 2000-302951 A | 10/2000 |
| JP | 2000-327891 | 11/2000 |
| JP | 2000-336256 A | 12/2000 |
| JP | 2001-18344 A | 1/2001 |
| JP | 2001-40197 | 2/2001 |
| JP | 2001-64496 A | 3/2001 |
| JP | 2001-214044 A | 8/2001 |
| JP | 2001-279068 A | 10/2001 |
| JP | 2001-302833 A | 10/2001 |
| JP | 2001-354842 A | 12/2001 |
| JP | 2002-53740 A | 2/2002 |
| JP | 2002-53741 A | 2/2002 |
| JP | 2002-121362 A | 4/2002 |
| JP | 2002-129002 A | 5/2002 |
| JP | 2002-129483 A | 5/2002 |
| JP | 10-363908 A | 7/2002 |
| JP | 2002-275217 A | 9/2002 |
| JP | 2002-294043 A | 10/2002 |
| JP | 2003-20386 A | 1/2003 |
| JP | 2003-128773 A | 5/2003 |
| JP | 2003-128889 A | 5/2003 |
| JP | 2003-128890 A | 5/2003 |
| JP | 2003-128894 A | 5/2003 |
| JP | 2003-154539 A | 5/2003 |
| JP | 2003-155401 A | 5/2003 |
| JP | 2003-155402 A | 5/2003 |
| JP | 2003-171537 A | 6/2003 |
| JP | 2003-191266 A | 7/2003 |
| JP | 2003-201391 A | 7/2003 |
| JP | 2003-277592 A | 10/2003 |
| JP | 2004-143353 A | 5/2004 |
| JP | 2001-200146 A | 7/2004 |
| JP | 2004-182759 A | 7/2004 |
| JP | 2004-238534 A | 8/2004 |
| JP | 2005-8771 A | 1/2005 |
| WO | WO 87/03291 A | 6/1987 |
| WO | WO 87 03291 A | 6/1987 |
| WO | WO 94 28061 A | 12/1994 |
| WO | WO 94/28061 A | 12/1994 |
| WO | WO 95 14734 | 6/1995 |
| WO | WO 95/20614 A1 | 8/1995 |
| WO | WO 97 10302 | 3/1997 |
| WO | WO 97/42260 | 11/1997 |
| WO | WO 97 49757 A | 12/1997 |
| WO | WO 99/23146 A1 | 5/1999 |
| WO | WO 99 47605 A | 9/1999 |
| WO | WO 00/37544 A1 | 6/2000 |
| WO | WO 01/85451 A1 | 11/2001 |
| WO | WO 02/28967 A1 | 4/2002 |
| WO | WO 2004/029147 A1 | 4/2004 |
| WO | WO 2004/060990 A2 | 7/2004 |

OTHER PUBLICATIONS

W.V. Titow, PVC Technology, 4$^{th}$ Edition, pp. 803-848 (1984), Elsevier Publishing Co.

Material Safety Data Sheet, "EASTAR" Petg Copolyester 6763, Oct. 23, 1997.

Elias, H., *Macromolecules*, Plenum Press: NY, 1977, p. 391.

Office Action dated Oct. 1, 2004 for U.S. Appl. No. 10/722,870 filed on Nov. 26, 2003.

John Davis, Flame retardants: halogen-free systems (including phosphorus additives), Plastics Additives: An A-Z Reference, 1998, pp. 278-286, Chapman & Hall, London.

Office action dated Oct. 1, 2004 for U.S. Appl. No. 10/722,870 (80063) filed on Nov. 26, 2003.

Office action dated Jun. 9, 2005 for U.S. Appl. No. 10/722,870 (80063) filed on Nov. 26, 2003.

International Search Report dated Apr. 27, 2005, for PCT/US2004/041737 (80077).

International Search Report dated Apr. 27, 2005, for PCT/US2004/041638 (80078).

Office action dated Jun. 22, 2005 for U.S. Appl. No. 10/706,669 (71608) filed on Nov. 2, 2003.

* cited by examiner

FILMS PREPARED FROM PLASTICIZED POLYESTERS

CROSS REFERENCE TO RELATED APPLICATIONS

This application claims the benefit of U.S. Provisional Application Ser. No. 60/282,996 filed Apr. 11, 2001.

TECHNICAL FIELD OF THE INVENTION

This invention relates to the preparation of flexible films or sheets from plasticized polyester compositions. More particularly, this invention relates to the preparation of such films or sheets that undergo induced crystallization, such as via calendering.

BACKGROUND OF THE INVENTION

Certain polymeric materials such as poly(vinyl chloride) (PVC) and cellulose esters such as cellulose acetate, cellulose acetate propionate and cellulose acetate butyrate must be plasticized to be processed into molded or extruded objects. Most other thermoplastic resins such as polyesters, polyamides and polyolefins do not typically contain a plasticizer when processed in the molten state to form rigid molded or extruded objects. However, the use of plasticizers in polyester compositions has been disclosed for various applications.

U.S. Pat. No. 4,450,250 to McConnell et al. describes adhesive compositions based on amorphous or crystallizable polyesters having a melting point in the range of 80 to 230° C. containing 1 to 35 weight percent of selected plasticizers.

U.S. Pat. No. 4,340,526 to Petke et al. describes hot melt adhesive compositions based on certain terephthalate and 1,4-cyclohexanedicarboxylate polyesters containing 10 to 35 weight percent of benzoate or phthalate plasticizers. The plasticizers are present to lower the melt viscosity of the polyesters in order to facilitate their use as hot melt adhesives.

Japan Patent No. 02 986197 to Kiyomi et al. describes extruded flat or tubular film based on polyesters plasticized with 1 to 40 parts of several types of plasticizer per 100 parts of polyester, i.e. up to 28 weight percent plasticizer in overall composition. Many of the plasticizers cited are of an aliphatic nature. The films are used as shrink films.

U.S. Pat. No. 5,624,987 to Brink et al. describes polyester compositions comprising a blend of poly(1,4-cyclohexylenedimethylene terephthalate) (PCT) copolyesters containing at least 80 mole percent of 1,4-cyclohexanedimethanol (CHDM) and 0.5 to 25 weight percent of one or more polyalkylene ethers. These ethers decrease the glass transition temperature (Tg) of the polyester, increase the rate of crystallization and allow the use of low molding temperatures.

U.S. Pat. No. 5,824,398 to Shih describes heat shrinkable film or sheet comprising 90 to 99 weight percent of a polyester having a Tg in the range of 40 to 150° C. and comprising at least 80 mole percent of aromatic dicarboxylic acids having 8 to 14 carbon atoms and at least 10 mole percent CHDM and 1 to 10 weight percent of a monoglyceride having 5 to 35 carbon atoms. The monoglyceride lowers the Tg of the blend.

U.S. Pat. No. 4,391,938 to Memon describes polyethylene terephthalate (PET) compositions containing 1 to 10 weight percent of an additive to improve the crystallization rate of the polyester and to improve the surface appearance of molded parts. Additives include certain plasticizers, fast crystallizing polyesters such as poly(butylene terephthalate) (PBT), glass fibers and talc, which would act as a nucleation agent in PET.

Anonymous Research Disclosure 23314, September 1983, describes polyester compositions having improved gas barrier properties for use in making film or sheet. The polyesters contain 80 to 99 weight percent of a homo or copolyester containing an aromatic dicarboxylic acid such as terephthalic acid and one or more glycols containing 2 to 12 carbon atoms and 1 to 20 weight percent of benzoic acid esters or phthalic acid esters.

Great Britain Patent No. 815,991 to Goodale et al. describes a process for making dibenzoate esters from glycols and butyl benzoate using a calcium oxide ester exchange catalyst. These esters are reported to be plasticizers for PVC resins.

U.S. Pat. No. 3,186,961 to Sears describes polycarbonate resins plasticized with a wide range of plasticizers. The molten blends must be quenched to achieve the desired properties. The presence of the plasticizer increases the rate of crystallization of the polycarbonate.

U.S. Pat. No. 2,044,612 to Jaeger describes plasticizers for several polymeric materials such as cellulose esters, phenol/formaldehyde resins, urea resins and the like.

Great Britain 1,323,478 (1973) assigned to Stamicarbon N.V. describes the preparation of dibenzoate plasticizers for use in PVC and poly(vinyl acetate) compositions In the manufacture of film and sheet, processes such as calendering and extrusion are used to produce film and sheet from a wide variety of plastics. Calendering in particular is used to produce film and sheet from plastics such as plasticized and rigid PVC compositions. On a smaller scale, other thermoplastic polymers such as thermoplastic rubbers, certain polyurethanes, talc-filled polypropylene, acrylonitrile/butadiene/styrene terpolymers (ABS resins) and chlorinated polyethylene are sometimes processed by calendering methods. U.S. Pat. No. 6,068,910 to Flynn et al. discloses the feasibility of calendering certain polyesters having a crystallization half time from the molten state of at least 5 minutes to provide film and sheet. Although this patent recognized the need for processing aids to prevent molten polymer from sticking to the calender rolls, large concentrations of plasticizers were not used.

BRIEF SUMMARY OF THE INVENTION

A process for preparing a film or sheet having a glass transition temperature below about 23° C. and a melting temperature greater than about 120° C. comprises the steps of:

(a) preparing a polyester composition comprising
 (i) about 50 to about 95 weight percent of a base copolyester having a melting temperature of less than about 220° C. and exhibiting more than 1 percent crystallinity after annealing for 2000 minutes at a temperature of which the base copolyester has a maximum crystallization rate, and
 (ii) about 5 to about 50 weight percent of a plasticizer suitable for use with the base copolyester;

(b) forming the polyester composition into a film or sheet; and (c) inducing crystallization during step (b) or after step (b).

In another embodiment, a film or sheet has a glass transition temperature below about 23° C. and a melting temperature greater than about 120° C. and comprises a polyester composition comprising (a) about 50 to about 95 weight percent of a base copolyester having a melting temperature of less than about 220° C. and exhibiting more than 1 percent crystallinity after annealing for 2000 minutes at a temperature of which the base copolyester has a maximum crystallization rate and (b) about 5 to about 50 weight percent of a plasticizer suitable for use with the base copolyester.

DETAILED DESCRIPTION OF THE INVENTION

Figure 1:
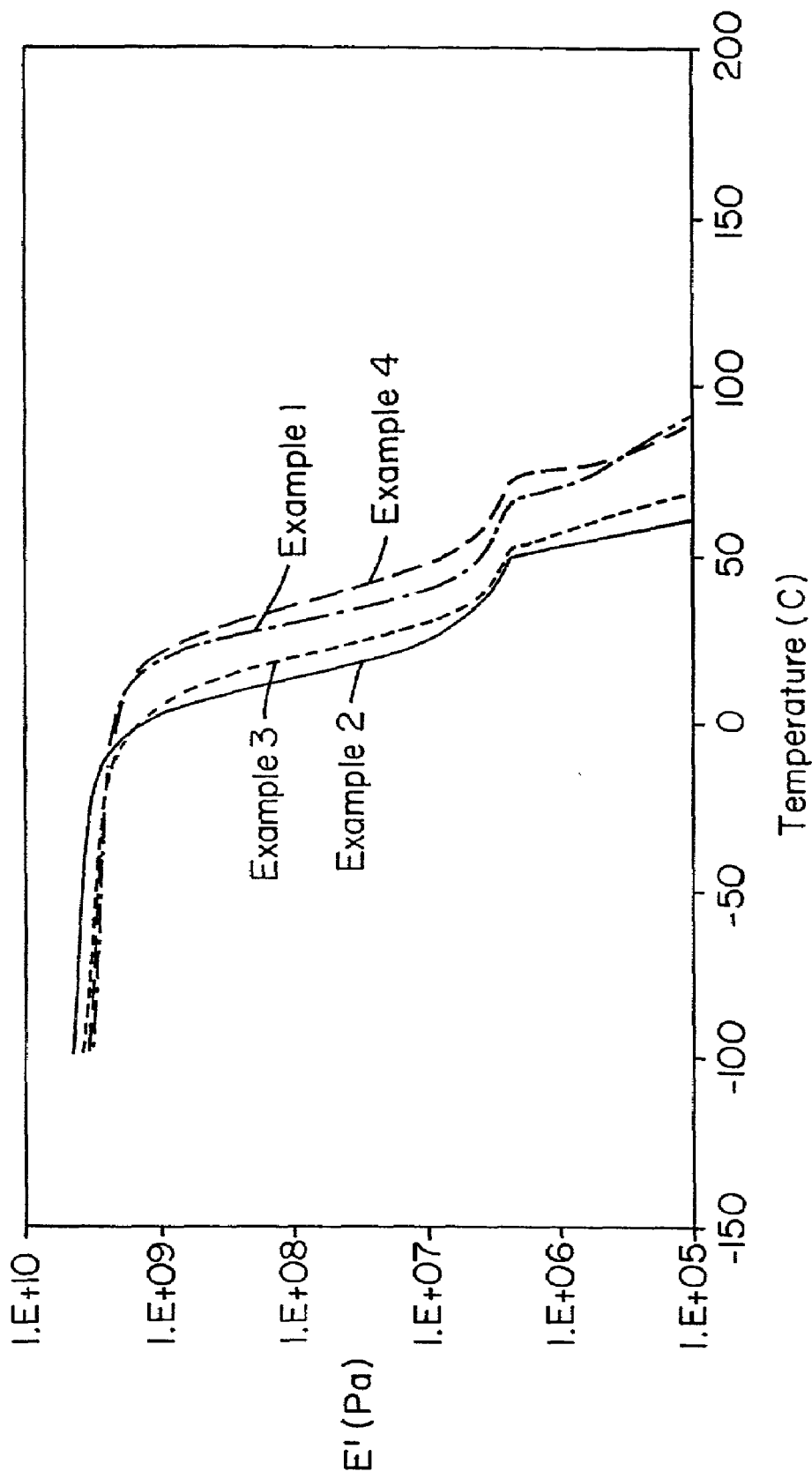
FIG. 1 is a dynamic mechanical analysis, DMTA, curve of Examples 1 to 4.

This invention relates to a process for preparing a film or sheet from a plasticized polyester composition. Unexpectedly the film or sheet formed is soft and flexible having a glass transition temperature (Tg) below about 23° C., preferably below about 0° C., and a crystalline melting point (Tm) above about 120° C., preferably above about 140° C. To obtain such a film or sheet the plasticized polyester composition undergoes induced crystallization either during or after the formation of the film or sheet. More specifically, the process for preparing the film or sheet of the present invention comprises the steps of:

(a) preparing the polyester composition that comprises a base copolyester and a plasticizer;
(b) forming the polyester composition into a film or sheet; and
(c) inducing crystallization during step (b) or after step (b).

The polyester composition comprises about 50 to about 95 weight percent, preferably about 50 to about 80 weight percent and more preferably about 60 to about 75 weight percent, of the base copolyester and about 5 to about 50 weight percent, preferably about 20 to about 50 weight percent and more preferably about 25 to about 40 weight percent, of the plasticizer or combination of plasticizers suitable for use with the base copolyester. The base copolyester has a melting temperature of less than about 220° C. and exhibits more than about 1 percent crystallinity after annealing for 2000 minutes at a temperature of which the base copolyester has a maximum crystallization rate.

The base copolyester of the polyester composition preferably comprises (i) a diacid component comprising residues of at least about 80 mole percent of a primary diacid selected from terephthalic acid, naphthalenedicarboxylic acid, 1,4-cyclohexanedicarboxylic acid, isophthalic acid or mixtures thereof and (ii) a diol component comprising residues of at least about 80 mole percent of at least one primary diol containing 2 to about 10 carbon atoms. The diacid component is based on 100 mole percent and the diol component is based on 100 mole percent.

Any of the various isomers of naphthalenedicarboxylic acid or mixtures of isomers may be used but the 1,4-, 1,5-, 2,6- and 2,7-isomers are preferred. Also, cis, trans or cis/trans isomer mixtures of 1,4-cyclohexanedicarboxylic acid may be used. The diacid component may be modified with up to about 20 mole percent of a modifying diacid containing from about 4 to about 40 carbon atoms, such as succinic acid, glutaric acid, adipic acid, suberic acid, sebacic acid, azelaic acid, dimer acid, sulfoisophthalic acid or mixtures thereof.

For the diol component of the base copolyester, the preferred primary diol includes ethylene glycol, diethylene glycol, neopentyl glycol, 1,4-cyclohexanedimethanol or mixtures thereof. More preferably, the primary diol comprises residues of from about 10 to 100 mole percent 1,4-cyclohexanedimethanol (CHDM) and from about 90 to 0 mole percent ethylene glycol. Even, more preferably, the primary diol comprises residues of from about 10 to about 40 mole percent CHDM and from about 90 to about 60 mole percent ethylene glycol. The diol residue component may also be modified with up to about 20 mole percent of other diols. Suitable modifying diols include 1,3-propanediol, propylene glycol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-CHDM or mixtures thereof. Also small amounts of polyalkylene glycols such as polyethylene glycol, polypropylene glycol, and polytetramethylene glycol may be used if desired. The CHDM moiety may be as the cis, trans or cis/trans mixture of isomers.

Sometimes the melt viscosity and melt strength of the base copolyester are insufficient for suitable processing on calendering equipment. In these cases, the use of a melt strength enhancer is desirable such as by the addition of small amounts (about 0.1 to about 2.0 mole percent) of a branching agent to the copolyester either during their initial preparation or during subsequent blending or feeding procedures prior to reaching the calendering equipment. Suitable branching agents include multifunctional acids or alcohols such as trimellitic acid, trimellitic anhydride, pyromellitic dianhydride, trimethylolpropane, glycerol, pentaerythritol, citric acid, tartaric acid, and 3-hydroxyglutaric acid. These branching agents may be added directly to the copolyester or blended with the copolyester in the form of a concentrate as described in U.S. Pat. Nos. 5,654,347 and 5,696,176. It is also possible to use agents such as sulfoisophthalic acid to increase the melt strength of the polyester to a desirable level as disclosed in U.S. Pat. No. 5,399,595.

The copolyesters used in the present invention are readily prepared by melt phase techniques well known in the art. In addition, some of the copolyesters may be made by a combination of melt phase and solid phase polycondensation procedures also well known in the art. The inherent viscosity, IV, of useful polyesters will generally range from about 0.4 to about 1.5 dL/g and preferably about 0.6 to about 1.2 dL/g. IV measurements are generally made at 25° C. using 0.50 gram of polymer in 100 mL of a solvent composed of 60 weight percent phenol and 40 weight percent 1,1,2,2-tetrachloroethane.

The plasticizer for use in the present invention should be suitable for use with the copolyester. The presence of the plasticizer is quite beneficial to lower the processing temperature of the polyester, to prevent sticking to the rolls, to eliminate predrying of the polyester and to create elastomeric materials having good mechanical properties. The preferred range of plasticizer content will depend on the properties of the base polyester and the plasticizer. In particular, the lower the Tg of the base copolyester and/or the plasticizer as predicted by the well-known Fox equation (T. G. Fox, Bull. Am. Phys. Soc., 1, 123 (1956)), the lesser the amount of plasticizer needed to obtain the polyester composition that produces a film or sheet having a Tg below 23° C. For the polyester compositions described in Examples 1–13, the preferred range of plasticizer content is from about 20 to about 50 weight percent and more preferably from about 25 to about 40 weight percent.

Preferred plasticizers dissolve a film of the polyester to produce a clear solution at temperatures below about 160° C. This property of the plasticizer is referred to as its solubility. The procedure for determining whether a plasticizer has the appropriate solubility is as follows. Materials required for the test include a standard reference film of 5 mils (0.127 mm) in thickness, a small vial, a heating block or oven and a plasticizer. The following steps are performed:

1. In the vial, place a piece of the film of a width of the vial and ½ inches long.
2. Add the plasticizer to the vial until the film is covered completely.
3. Place the vial with the film and plasticizer on a shelf to observe after one hour and again at 4 hours. Note the appearance of the film and liquid.
4. After the ambient observation, place the vial in a heating block and allow the temperature to remain constant at 75° C. for one hour and observe the appearance of the film and liquid.
5. Repeat step 4 for each of the following temperatures (° C.): 75, 100, 140, 150, and 160.

The results of several plasticizers tested for their solubility are set forth in Table 1 below. A value of 4 or greater over the temperature indicates that this plasticizer is candidate for use in the present invention.

TABLE 1

| | TEMPERATURE (° C.) | | | | | |
|---|---|---|---|---|---|---|
| | 23 | 75 | 100 | 140 | 150 | 160 |
| Adipic Acid Derivatives | | | | | | |
| Dicapryl adipate | 1 | 1 | 1 | 1 | 2 | 2 |
| Di-(2-ethylhexyl adipate) | 1 | 1 | 1 | 1 | 2 | 2 |
| Di(n-heptyl, n-nonyl) adipate | 1 | 1 | 1 | 1 | 2 | 2 |
| Diisobutyl adipate | 1 | 3 | 3 | 3 | 3 | 4 |
| Diisodecyl adipate | 1 | 1 | 1 | 1 | 1 | 1 |
| Dinonyl adipate | 1 | 1 | 1 | 1 | 1 | 2 |
| Di-(tridecyl) adipate | 1 | 1 | 1 | 1 | 1 | 1 |
| Azelaic Acid Derivatives | | | | | | |
| Di-(2-ethylhexyl) azelate | 1 | 1 | 1 | 1 | 2 | 2 |
| Diisodecyl azelate | 1 | 1 | 1 | 1 | 1 | 1 |
| Diisoctyl azealate | 1 | 1 | 1 | 1 | 2 | 2 |
| Dimethyl azelate | 3 | 4 | 4 | 4 | 4 | 6 |
| Di-n-hexyl azelate | 1 | 1 | 2 | 2 | 3 | 3 |
| Benzoic Acid Derivatives | | | | | | |
| Diethylene glycol dibenzoate | 4 | 4 | 4 | 6 | 6 | 6 |
| Dipropylene glycol dibenzoate | 3 | 3 | 4 | 4 | 4 | 6 |
| Propylene glycol dibenzoate | 1 | 3 | 4 | 6 | 6 | 6 |
| Polyethylene glycol 200 dibenzoate | 4 | 4 | 4 | 4 | 6 | 6 |
| Neopentyl glycol dibenzoate | 0 | 3 | 3 | 3 | 4 | 6 |
| Citric Acid Derivatives | | | | | | |
| Acetyl tri-n-butyl citrate | 1 | 1 | 1 | 2 | 3 | 3 |
| Acetyl triethyl citrate | 1 | 2 | 2 | 2 | 3 | 3 |
| Tri-n-Butyl citrate | 1 | 2 | 3 | 3 | 3 | 3 |
| Triethyl citrate | 3 | 3 | 3 | 3 | 3 | 3 |
| Dimer Acid Derivatives | | | | | | |
| Bis-(2-hydroxyethyl dimerate) | 1 | 1 | 1 | 1 | 2 | 3 |
| Epoxy Derivatives | | | | | | |
| Epoxidized linseed oil | 1 | 2 | 2 | 2 | 3 | 3 |
| Epoxidized soy bean oil | 1 | 1 | 1 | 1 | 1 | 2 |
| 2-Ethylhexyl epoxytallate | 1 | 1 | 1 | 1 | 3 | 3 |
| Fumaric Acid Derivatives | | | | | | |
| Dibutyl fumarate | 2 | 2 | 3 | 3 | 3 | 3 |
| Glycerol Derivatives | | | | | | |
| Glycerol Tribenzoate | 0 | 0 | 6 | 6 | 6 | 6 |
| Glycerol triacetate | 2 | 3 | 3 | 3 | 3 | 4 |
| Glycerol diacetate monolaurate | 1 | 2 | 2 | 2 | 2 | 4 |
| Isobutyrate Derivative | | | | | | |
| 2,2,4-Trimethyl-1,3-pentanediol, Diisobutyrate | 1 | 1 | 1 | 1 | 3 | 3 |
| Texanol diisobutyrate | 1 | 2 | 2 | 2 | 2 | 4 |
| Isophthalic Acid Derivatives | | | | | | |
| Dimethyl isophthalate | 0 | 5 | 5 | 6 | 6 | 6 |
| Diphenyl isophthalate | 0 | 0 | 0 | 0 | 0 | 0 |
| Di-n-butylphthalate | 2 | 3 | 3 | 3 | 3 | 3 |
| Lauric Acid Derivatives | | | | | | |
| Methyl laurate | 1 | 2 | 3 | 3 | 3 | 3 |
| Linoleic Acid Derivative | | | | | | |
| Methyl linoleate, 75% | 1 | 1 | 2 | 3 | 3 | 3 |
| Maleic Acid Derivatives | | | | | | |
| Di-(2-ethylhexyl) maleate | 1 | 1 | 2 | 3 | 3 | 3 |
| Di-n-butyl maleate | 2 | 3 | 3 | 3 | 3 | 3 |
| Mellitates | | | | | | |
| Tricapryl trimellitate | 1 | 1 | 1 | 1 | 1 | 1 |
| Triisodecyl trimellitate | 1 | 1 | 1 | 1 | 1 | 1 |
| Tri-(n-octyl, n-decyl) trimellitate | 1 | 1 | 1 | 1 | 1 | 1 |
| Triisonyl trimellitate | 1 | 1 | 1 | 1 | 1 | 1 |
| Myristic Acid Derivatives | | | | | | |
| Isopropyl myristate | 1 | 1 | 1 | 2 | 3 | 3 |
| Oleic Acid Derivatives | | | | | | |
| Butyl oleate | 1 | 1 | 1 | 2 | 3 | 3 |
| Glycerol monooleate | 0 | 1 | 1 | 1 | 3 | 3 |
| Glycerol trioleate | 1 | 1 | 1 | 1 | 2 | 2 |
| Methyl oleate | 1 | 1 | 2 | 2 | 3 | 3 |
| n-Propyl oleate | 1 | 1 | 1 | 2 | 3 | 3 |
| Tetrahydrofurfuryl oleate | 1 | 1 | 1 | 2 | 3 | 3 |
| Palmitic Acid Derivatives | | | | | | |
| Isopropyl palmitate | 1 | 1 | 1 | 1 | 2 | 3 |
| Methyl palmitate | 0 | 1 | 1 | 2 | 3 | 3 |
| Paraffin Derivatives | | | | | | |
| Chloroparaffin, 41% Cl | 1 | 1 | 2 | 2 | 2 | 3 |
| Chloroparaffin, 50% Cl | 1 | 2 | 3 | 3 | 3 | 3 |
| Chloroparaffin, 60% Cl | 1 | 5 | 6 | 6 | 6 | 6 |
| Chloroparaffin, 70% Cl | 0 | 0 | 0 | 0 | 0 | 0 |
| Phosphoric Acid Derivatives | | | | | | |
| 2-Ethylhexyl diphenyl phosphate | 2 | 3 | 3 | 3 | 4 | 4 |
| Isodecyl diphenyl phosphate | 1 | 2 | 3 | 3 | 3 | 3 |
| t-Butylphenyl diphenyl phosphate | 1 | 3 | 3 | 4 | 6 | 6 |
| Tri-butoxyethyl phosphate | 1 | 2 | 3 | 4 | 4 | 4 |
| Tributyl phosphate | 2 | 3 | 3 | 3 | 3 | 3 |

TABLE 1-continued

| | TEMPERATURE (° C.) | | | | | |
|---|---|---|---|---|---|---|
| | 23 | 75 | 100 | 140 | 150 | 160 |
| Tricresyl phosphate | 1 | 3 | 3 | 4 | 6 | 6 |
| Triphenyl phosphate | 0 | 4 | 4 | 6 | 6 | 6 |
| Phthalic Acid Derivatives | | | | | | |
| Butyl benzyl phthalate | 2 | 3 | 3 | 6 | 6 | 6 |
| Texanol benzyl phthalate | 2 | 2 | 2 | 2 | 2 | 4 |
| Butyl octyl phthalate | 1 | 1 | 2 | 2 | 3 | 3 |
| Dicapryl phthalate | 1 | 1 | 1 | 1 | 2 | 2 |
| Dicyclohexyl phthalate | 0 | 1 | 2 | 2 | 4 | 5 |
| Di-(2-ethylhexyl) phthalate | 1 | 1 | 1 | 2 | 3 | 3 |
| Diethyl phthalate | 4 | 4 | 4 | 6 | 6 | 6 |
| Dihexyl phthalate | 1 | 2 | 3 | 3 | 3 | 3 |
| Diisobutyl phthalate | 1 | 3 | 3 | 3 | 3 | 5 |
| Diisodecyl phthalate | 1 | 1 | 1 | 1 | 2 | 2 |
| Diisoheptyl phthalate | 1 | 1 | 2 | 3 | 3 | 3 |
| Diisononyl phthalate | 1 | 1 | 1 | 1 | 2 | 3 |
| Diisooctyl phthalate | 1 | 1 | 2 | 2 | 3 | 3 |
| Dimethyl phthalate | 1 | 5 | 6 | 6 | 6 | 6 |
| Ditridecyl phthalate | 1 | 1 | 1 | 1 | 2 | 3 |
| Diundecyl phthalate | 1 | 1 | 1 | 2 | 2 | 2 |
| Ricinoleic Acid Derivatives | | | | | | |
| Butyl ricinoleate | 1 | 1 | 2 | 3 | 3 | 3 |
| Glycerol tri(acetyl) ricinlloeate | 1 | 1 | 1 | 2 | 1 | 1 |
| Methyl acetyl ricinlloeate | 1 | 1 | 2 | 3 | 3 | 3 |
| Methyl ricinlloeate | 1 | 2 | 3 | 3 | 3 | 4 |
| n-Butyl acetyl ricinlloeate | 1 | 1 | 1 | 2 | 3 | 3 |
| Propylene glycol ricinlloeate | 1 | 1 | 3 | 3 | 4 | 4 |
| Sebacic Acid Derivatives | | | | | | |
| Dibutyl sebacate | 1 | 2 | 3 | 3 | 3 | 3 |
| Di-(2-ethylhexyl) sebacate | 1 | 1 | 1 | 2 | 2 | 3 |
| Dimethyl sebacate | 0 | 4 | 4 | 6 | 6 | 6 |
| Stearic Acid Derivatives | | | | | | |
| Ethylene glycol monostearate | 0 | 1 | 2 | 3 | 3 | 3 |
| Glycerol monostearate | 0 | 0 | 1 | 2 | 2 | 2 |
| Isopropyl isostearate | 3 | 3 | 3 | 6 | 6 | 6 |
| Methyl stearate | 0 | 1 | 2 | 2 | 2 | 3 |
| n-Butyl stearate | 1 | 1 | 2 | 3 | 3 | 3 |
| Propylene glycol monostearate | 0 | 1 | 1 | 2 | 2 | 3 |
| Succinic Acid Derivatives | | | | | | |
| Diethyl succinate | 3 | 3 | 4 | 5 | 6 | 6 |
| Sulfonic Acid Derivatives | | | | | | |
| N-Ethyl o,p-toluenesulfonamide | 2 | 5 | 6 | 6 | 6 | 6 |
| o,p-toluenesulfonamide | 0 | 0 | 0 | 6 | 6 | 6 |

Key
0 = Plasticizer is a solid at this temperature
1 = Plasticizer is liquid, yet nothing happening to the film
2 = film has begun to haze
3 = film has swollen
4 = film has begun to change as disintegrating off and/or liquid becoming hazy
5 = no longer a film, liquid is hazy
6 = liquid is clear A similar test to that above can be referenced in "The Technology of Plasticizers", by J. Kern Sears and Joseph R. Darby, published by Society of Plastic Engineers/Wiley and Sons, New York, 1982, pp 136–137. In this test, a grain of the polymer is placed in a drop of plasticizer on a heated microscope stage. If the polymer disappears, then it is solubilized.

The plasticizers that are most effective at solubilizing the polyester have a solubility of greater than 4 according to Table 1 and can also be classified according to their solubility parameter. The solubility parameter, or square root of the cohesive energy density, of a plasticizer can be calculated by the method described by Coleman et al., *Polymer* 31, 1187 (1990), herein incorporated by reference. The most preferred plasticizers will have a solubility parameter ($\delta$) in the range from about 9.5 to about 13.0 cal$^{0.5}$cm$^{-1.5}$. Table 2 demonstrates that plasticizers with a solubility parameter within this range solubilize the polyester while those plasticizers with a solubility parameter outside of this range are much less effective. In general, higher molecular weight plasticizers are preferred to prevent smoking and loss of plasticizer during the calendering process.

TABLE 2

| Plasticizer | $\delta$ (cal$^{0.5}$cm$^{-1.5}$) | Solubility @ 160° C. from Table 1 |
|---|---|---|
| Glycerol diacetate monolaurate | 8.1 | 4 |
| Texanol diisobutyrate | 8.4 | 4 |
| Di-2-ethylhexyladipate | 8.5 | 2 |
| Trioctyltrimellitate | 8.8 | 1 |
| Di-2-ethylhexylphthalate | 8.9 | 2 |
| Texanol benzyl phthalate | 9.5 | 4 |
| Neopentyl glycol dibenzoate | 9.8 | 6 |
| Dipropylene glycol dibenzoate | 10.0 | 6 |
| Butyl benzyl phthalate | 10.1 | 6 |
| Propylene glycol dibenzoate | 10.3 | 6 |
| Diethylene glycol dibenzoate | 10.3 | 6 |
| Glycerol tribenzoate | 10.6 | 6 |

Particular plasticizers suitable for use in the present invention include esters based on an acid moiety selected from phthalic acid, adipic acid, trimellitic acid, benzoic acid, azelaic acid, terephthalic acid, isophthalic acid, butyric acid, glutaric acid, citric acid and phosphoric acid. The alcohol moiety is selected from aliphatic, cycloaliphatic or aromatic alcohols containing from about 1 to about 20 carbon atoms. Suitable alcohol moieties include those based on methanol, ethanol, propanol, isopropanol, butanol, isobutanol, stearyl alcohol, lauryl alcohol, phenol, benzyl alcohol, ethylene glycol, neopentyl glycol, CHDM, and diethylene glycol.

In step (b) and (c) of the present invention the polyester composition is respectively formed into a film or sheet and crystallization is induced. Inducing crystallization may be done either during or after forming the film or sheet. In one preferred embodiment, forming of the film or sheet occurs by melt extrusion or cast extrusion and inducing crystallization occurs after forming by stretching. In another preferred embodiment, forming of the film or sheet occurs by melt extrusion or cast extrusion and inducing crystallization occurs after forming by annealing at a temperature greater than the glass transition temperature of the film and less than melting temperature of the base copolyester. In still another preferred embodiment, forming of the film or sheet and inducing crystallization occur together during step (b) by calendering or blown film extrusion.

The most preferred embodiment of the present invention is a process for preparing a film or sheet comprising the steps of:
(a) preparing a polyester composition comprising
(i) about 50 to about 80 weight percent of a base copolyester having a melting temperature of less than about 220° C. and a glass transition temperature of greater than about 60° C. and exhibiting more than about 1 percent crystallinity after annealing for 2000 minutes at a temperature of which the base copolyester has a maximum crystallization rate, and (ii) about 20, preferably about 25, to about 50 weight percent of a plasticizer suitable for use with the base copolyester.

(b) forming the polyester composition into a film or sheet; and (c) inducing crystallization during step (b) or after step (b);

wherein after step (c) the film or sheet has a glass transition temperature below about 23° C. and a melting temperature greater than about 140° C. In such a process the base copolyester preferably comprises a diacid component comprising residues of at least 80 mole percent of a primary diacid selected from the group consisting of terephthalic acid, naphthalenedicarboxylic acid, 1,4-cyclohexanedicarboxylic acid, isophthalic acid and mixtures thereof and a diol component comprising residues of about 10 to about 40 mole percent 1,4-cyclohexanedimethanol and about 90 to 60 mole percent ethylene glycol, wherein the diacid component is based on 100 mole percent and the diol component is based on 100 mole percent. The plasticizer is preferably selected from the group consisting of neopentyl glycol dibenzoate, diethylene glycol dibenzoate, butyl benzyl phthalate; Texanol benzyl phthalate.

In another embodiment of the present invention, a film or sheet has a glass transition temperature below about 23° C., preferably below about 0° C., and a melting temperature greater than about 120° C., preferably greater than about 140° C.; and comprises a polyester composition comprising (a) about 50 to about 95 weight percent of a base copolyester having a melting temperature of less than about 220° C. and exhibiting more than about 1 percent crystallinity after annealing for 2000 minutes at a temperature of which the base copolyester has a maximum crystallization rate and (b) about 50 to about 5 weight percent of a plasticizer suitable for use with the base copolyester.

Preferably, base copolyester comprises a diacid component comprising residues of at least about 80 mole percent of a primary diacid selected from the group consisting of terephthalic acid, naphthalenedicarboxylic acid, 1,4-cyclohexanedicarboxylic acid, isophthalic acid and mixtures thereof and a diol component comprising residues of at about least 80 mole percent of at least one primary diol containing 2 to about 10 carbon atoms, wherein the diacid component is based on 100 mole percent and the diol component is based on 100 mole percent.

Preferably, the plasticizer presenting the film or sheet is present in an amount of from about 20 weight percent to about 50 weight percent. The plasticizer is preferably selected from one that dissolves a 5-mil thick film of the base copolyester to produce a clear solution at a temperature below 160° C. More preferably, the plasticizer is selected from one that has a solubility parameter in the range from about 9.5 to about 13.0 $cal^{0.5}cm^{-1.5}$.

More preferably, base copolyester comprises a diacid component comprising residues of at least about 80 mole percent of a primary diacid selected from the group consisting of terephthalic acid, naphthalenedicarboxylic acid, 1,4-cyclohexanedicarboxylic acid, isophthalic acid and mixtures thereof and a diol component comprising residues of about 10 to about 40 mole percent 1,4-cyclohexanedimethanol and about 60 to 90 mole percent ethylene glycol, wherein the diacid component is based on 100 mole percent and the diol component is based on 100 mole percent. The plasticizer is selected from the group consisting of neopentyl glycol dibenzoate, diethylene glycol dibenzoate, butyl benzyl phthalate; and texanol benzyl phthalate.

This invention can be further illustrated by the following examples of preferred embodiments thereof, although it will be understood that these examples are included merely for purposes of illustration and are not intended to limit the scope of the invention unless otherwise specifically indicated.

EXAMPLES

Examples 1–9

A polyester, which contains an acid component of 100 mole % terephthalic acid and a glycol component of 31 mole % 1,4-cyclohexanedimethanol and 69 mole % ethylene glycol and has an IV of 0.76 dL/g, a weight average molecular weight of 40400 g/mol and a Tg of about 78° C., was pre-dried at 65° C. for 12 hours in a dehumidified dryer and compounded with various plasticizers, as listed in Table 3, using a 30-mm Werner-Pfleiderer 40:1 L/D co-rotating twin screw extruder. Without additional drying, the extruded compositions were then formed into films having a thickness of 0.254 mm using a 25.4-mm Killion extruder fifted with a 152-mm film die. The films were subsequently annealed in a vacuum oven at 100° C. for 90 minutes. Properties of the films including Tg, Tm, and weight average molecular weight before (Comparative Examples 1–4) and after (Illustrative Examples 5–8) the annealing process are summarized in Table 3. Examples 1 to 4 display a Tg below 23° C. as measured by differential scanning calorimetry, DSC, at a heating rate of 20° C./min. Examples 1–4 show no Tm. The annealed compositions, Examples 5–8, exhibit a Tg below 23° C. as well as a Tm between 140° C. and 170° C.

Dynamic mechanical thermal analysis, DMTA, curves of Examples 1 to 4 are presented in FIG. 1. All DMTA experiments were performed at an operating frequency of 16 Hz and a heating rate of 10° C./minute. Below the onset of the Tg, the compositions possess a high modulus indicative of a rigid material. During the transition from glass to rubber, the modulus falls precipitously. This region of the DMTA curve is commonly referred to as the leathery region because of the texture and feel of the material. At the end of the glass transition region, the DMTA curves display a short plateau that extends to between 50 and 80° C., which is followed by a drop in modulus due to viscous flow. This plateau defines the temperature regime where the composition is soft, flexible and rubber-like. Thus, the utility of Examples 1 to 4 is severely limited to a narrow range of temperatures above Tg defined by the short rubbery plateau.

Figure 2:
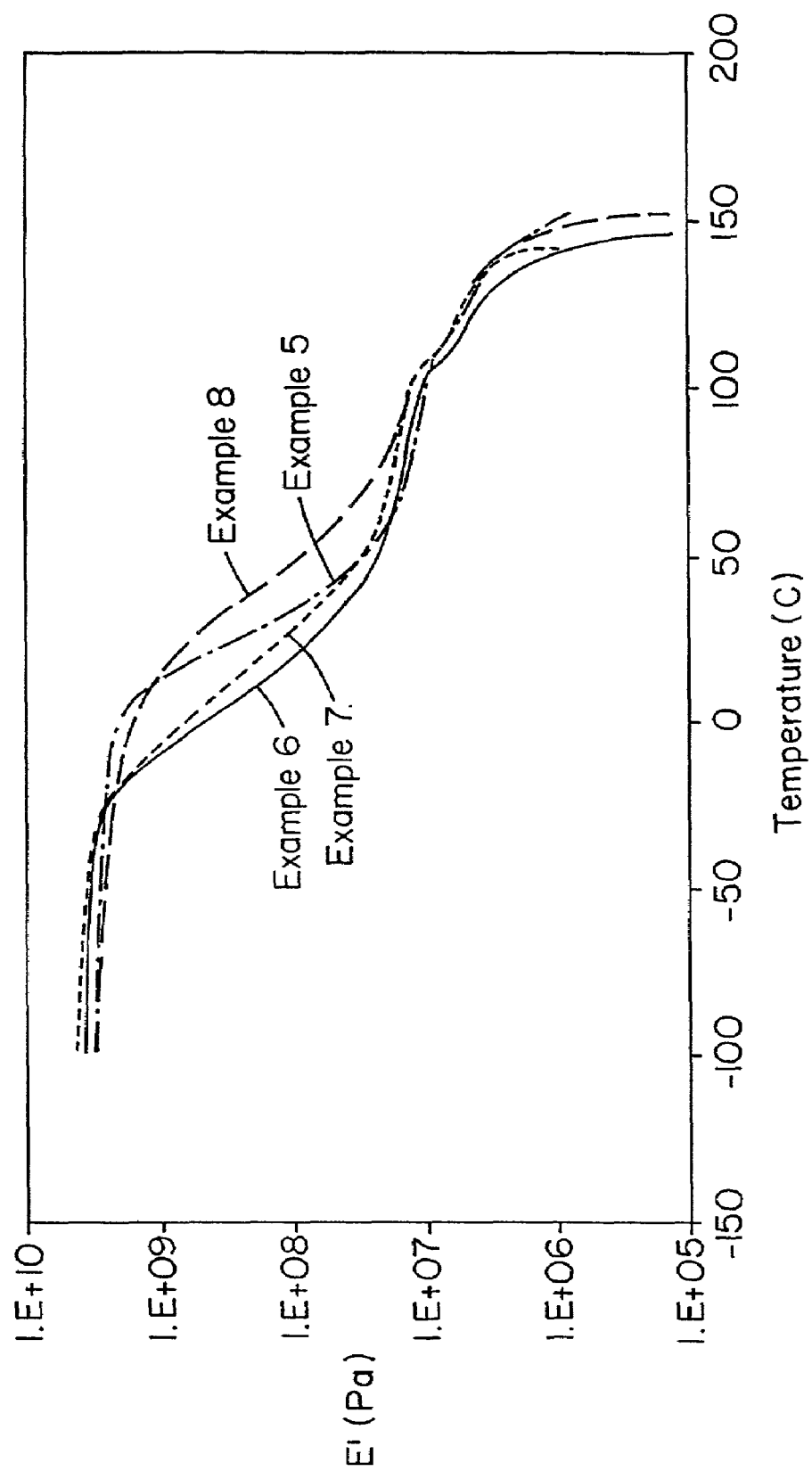
FIG. 2 is a DMTA curve of Examples 5 to 8.

DMTA curves of Examples 5 to 8 are presented in FIG. 2. Below the onset of Tg, the compositions possess a modulus similar to that of the non-annealed samples. The transition from glass to rubber in the annealed samples occurs over a broader range than in the non-annealed samples. At the end of the glass transition region, the DMTA curves display a plateau that extends to about 150° C., approximately 70° C. beyond the end of the rubbery plateau for the non-annealed samples. Consequently, the utility of Examples 5 to 8 now extends well beyond that for Examples 1 to 4. These results are totally unexpected.

TABLE 3

|  | Comparative Examples | | | | Illustrative Examples | | | |
| --- | --- | --- | --- | --- | --- | --- | --- | --- |
|  | 1 | 2 | 3 | 4 | 5 | 6 | 7 | 8 |
| Base Copolyester (wt %) | 70 | 70 | 70 | 70 | 70 | 70 | 70 | 70 |
| Neopentyl glycol dibenzoate (wt %) | 30 | | | | 30 | | | |
| Diethylene glycol dibenzoate (wt %) | | 30 | | | | 30 | | |
| Butyl Benzyl Phthalate (wt %) | | | 30 | | | | 30 | |
| Texanol Benzyl Phthalate (wt %) | | | | 30 | | | | 30 |
| Tg (° C.) by DSC | 16 | −3 | 5 | 18 | 14 | −23 | −24 | 16 |
| Tm (° C.) by DSC | — | — | — | — | 155 | 145 | 150 | 155 |
| Weight Avg. Molecular Weight by GPC (g/mol) | 39000 | 39400 | 39000 | 38000 | 39000 | 38600 | 38500 | 39800 |

Example 9

The polyester composition of Example 9, with data summarized in Table 4, was prepared the same as Example 1. This example shows the properties of an extruded film that was subsequently subjected to a 3×3 biaxial stretch at 23° C. to effect crystallization. The resulting film displays a Tg below 23° C. and a Tm of 151° C. Both induced crystallization by annealing and stretching result in a film of the present invention that is soft and flexible at room temperature.

Examples 10–13

The same base copolyester of Example 1 was pre-dried at 65° C. for 12 hours in a dehumidified dryer and compounded with various plasticizers, as listed in Table 4, using a 30-mm Werner-Pfleiderer 40:1 L/D co-rotating twin screw extruder. Without additional drying, the extruded compositions were placed on a Farrell two-roll mill at a set roll temperature of 150° C. After 10 minutes, the polyester composition was removed from the mill and fed through a 3-roll vertical calendering stack with roll temperatures ranging from 110–120° C. to produce 0.254-mm thick films. Properties of the films, including Tg, Tm, and weight average molecular weight, are summarized as Illustrative Examples 10–13 in Table 4. Each example has a Tg below 23° C. and a Tm between 150° C. and 165° C.

Figure 3:
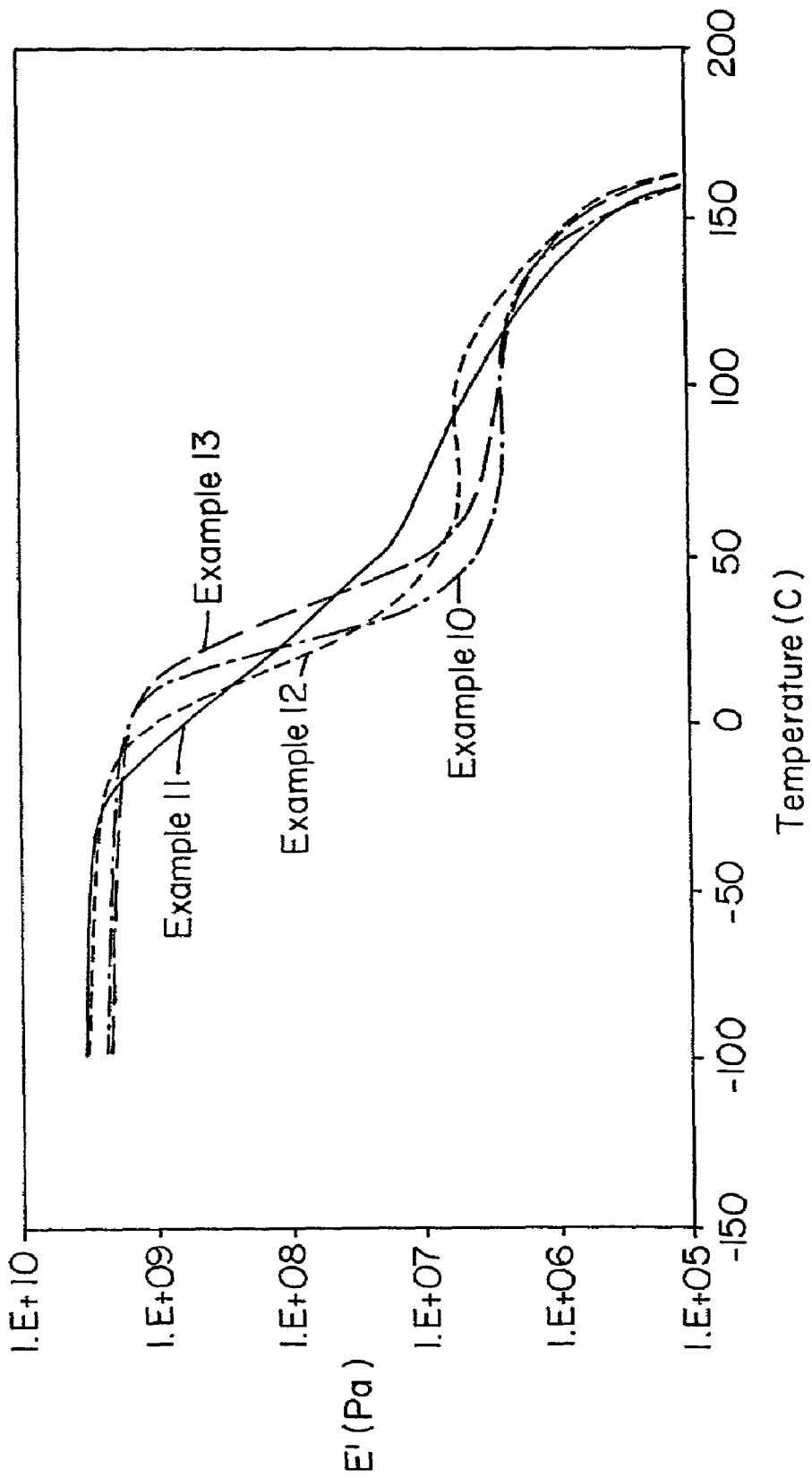
FIG. 3 is a DMTA curve of Examples 9 to 12.

DMTA curves of Examples 9 to 12 are presented in FIG. 3. Each example displays a rubbery plateau that extends beyond 150° C. Thus, films are formed with a Tg below 23° C. and rubber-like properties up to 150° C. These results are totally unexpected.

TABLE 4

|  | Illustrative Examples | | | | |
| --- | --- | --- | --- | --- | --- |
|  | 9 | 10 | 11 | 12 | 13 |
| Base Copolyester (wt %) | 70 | 70 | 70 | 70 | 70 |
| Neopentyl glycol dibenzoate (wt %) | | 30 | | | |
| Diethylene glycol dibenzoate (wt %) | 30 | | 30 | | |
| Butyl Benzyl Phthalate (wt %) | | | | 30 | |
| Texanol Benzyl Phthalate (wt %) | | | | | 30 |
| Tg (° C.) by DSC | −19 | 8 | −17 | −9 | 15 |
| Tm (° C.) by DSC | 151 | 164 | 164 | 163 | 166 |
| Weight Average Molecular Weight by GPC | 39400 | 38900 | 38500 | 37800 | 39200 |

*Examples 10–13 contain 0.50 wt % of a fatty acid ester release additive.

Example 14

The base copolyester of Example 1 was compounded with glycerol tribenzoate at 15 weight percent and 30 weight percent. The Tg of the 30 weight percent polyester composition was 32° C. Utilizing the Fox equation for predicting the Tg of polymer/plasticizer and polymer/polymer mixtures, a 40 weight percent glycerol tribenzoate polyester composition is expected to produce a mixture with a Tg below 23° C.

Examples 15–19

A base copolyester, as shown for each Example 15–19 in Table 5, was pre-dried at 65° C. for 12 hours in a dehumidified dryer and compounded with the plasticizer neopentyl glycol dibenzoate using a 30-mm Werner-Pfleiderer 40:1 L/D co-rotating twin screw extruder. Without additional drying, the extruded compositions were placed on a Farrell two-roll mill at a set roll temperature of 150° C. After 10 minutes, the polyester composition was removed from the mill and fed through a 3-roll vertical calendering stack with roll temperatures ranging from 110–120° C. to produce 0.254-mm thick films. Properties of the films, including Tg and Tm are summarized in Table 5. Examples 15–17 are illustrative examples of the present invention. While Examples 18 and 19 have a Tg greater than 23° C., the addition of more plasticizer would lower the Tg. In particular, utilizing the Fox equation, the Tg of a polyester composition utilizing the same base copolyester of Example 19 is predicted to be below 23° C. at 22 weight percent neopentyl glycol dibenzoate plasticizer.

TABLE 5

| | Examples | | | | |
|---|---|---|---|---|---|
| | 15 | 16 | 17 | 18 | 19 |
| Base Copolyester (wt %) | | | | | |
| PETG 6763[1] | 35 | | | 42.5 | 85 |
| Eastobond[2] | 35 | 35 | | 42.5 | |
| Embrace[3] | | 35 | 70 | | |
| Neopentyl glycol dibenzoate (wt %) | 30 | 30 | 30 | 15 | 15 |
| Tg (° C.) by DSC | 10 | 5 | 12 | 30 | 39 |
| Tm (° C.) by DSC | 154 | 166 | 170 | 170 | 172 |

[1]copolyester of a diacid component of 100 mole % terephthalic acid and a glycol component of 31 mole % 1,4-cyclohexanedimethanol and 69% percent ethylene glycol
[2]copolyester of a diacid component of 100 mole % terephthalic acid and a glycol component of 37 mole % diethylene glycol and 63 mole % ethylene glycol
[3]copolyester of a diacid component of 100 mole % terephthalic acid and a glycol component of 20 mole % 1,4-cyclohexanedimethanol, 9 mole % diethylene glycol and 71 mole % ethylene glycol

What is claimed is:

1. A process for preparing a film or sheet having a glass transition temperature below about 23° C. and a melting temperature greater than about 120° C. comprising the steps of:
   (a) preparing a polyester composition comprising
      (i) about 50 to about 95 weight percent of a base copolyester having a melting temperature of less than about 220° C. and exhibiting more than about 1 percent crystallinity after annealing for 2000 minutes at a temperature of which the base copolyester has a maximum crystallization rate, and
      (ii) about 5 to about 50 weight percent of a plasticizer suitable for use with the base copolyester;
   (b) forming the polyester composition into a film or sheet; and
   (c) inducing crystallization during step (b) or after step (b).

2. The process of claim 1 wherein the film or sheet has a glass transition temperature below about 0° C.

3. The process of claim 2 wherein the film or sheet has a melting temperature greater than about 140° C.

4. The process of claim 1 wherein the film or sheet has a melting temperature greater than about 140° C.

5. The process of claim 1 wherein the polyester composition comprises from about 50 to about 80 weight percent of the base copolyester and from about 20 to about 50 weight percent of the plasticizer.

6. The process of claim 5 wherein the polyester composition comprises from about 60 to about 75 weight percent of the base copolyester and from about 25 to about 40 weight percent of the plasticizer.

7. The process of claim 1 wherein the base copolyester comprises
   (i) a diacid component comprising residues of at least about 80 mole percent of a primary diacid selected from the group consisting of terephthalic acid, naphthalenedicarboxylic acid, 1,4-cyclohexanedicarboxylic acid, isophthalic acid and mixtures thereof and
   (ii) a diol component comprising residues of at least about 80 mole percent of at least one primary diol containing 2 to about 10 carbon atoms, based on 100 mole percent of the diacid component and 100 mole percent of the diol component.

8. The process of claim 7 wherein the diacid component further comprises residues of up to about 20 mole percent of a modifying diacid containing from about 4 to about 40 carbon atoms.

9. The process of claim 8 wherein the modifying diacid is selected from the group consisting of succinic acid, glutaric acid, adipic acid, suberic acid, sebacic acid, azelaic acid, dimer acid, sulfoisophthalic acid, and mixtures thereof.

10. The process of claim 7 wherein the primary diol is selected from the group consisting of ethylene glycol, diethylene glycol, neopentyl glycol, 1,4-cyclohexanedimethanol and mixtures thereof.

11. The process of claim 7 wherein the primary diol comprises residues of from about 10 to 100 mole percent 1,4-cyclohexanedimethanol and from 0 to about 90 mole percent ethylene glycol.

12. The process of claim 11 wherein the primary diol comprises from about 10 to about 40 mole percent 1,4-cyclohexanedimethanol and about 60 to about 90 mole percent ethylene glycol.

13. The process of claim 12 wherein the plasticizer is present in an amount of about 20 to about 50 weight percent.

14. The process of claim 7 wherein the diol component further comprises residues of up to about 20 mole percent of a modifying diol selected from the group consisting of 1,3-propanediol, propylene glycol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, and polyalkylene glycol.

15. The process of claim 1 wherein the plasticizer dissolves a 5-mil (0.127 mm) thick film of the base copolyester to produce a clear solution at a temperature below 160° C.

16. The process of claim 1 wherein the plasticizer has a solubility parameter in the range from about 9.5 to about 13.0 cal$^{0.5}$cm$^{-1.5}$.

17. The process claim 1 wherein the plasticizer is an ester based on
   (i) an acid moiety selected from the group consisting of phthalic acid, adipic acid, trimellitic acid, benzoic acid, azelaic acid, terephthalic acid, isophthalic acid, butyric acid, glutaric acid, citric acid and phosphoric acid and (ii) an alcohol moiety selected from the group consisting of aliphatic, cycloaliphatic, and aromatic alcohols containing from about 1 to about 20 carbon atoms.

18. The process of claim 17 wherein the alcohol moiety of the plasticizer is selected from the group consisting of methanol, ethanol, propanol, isopropanol, butanol, isobutanol, stearyl alcohol, lauryl alcohol, phenol, benzyl alcohol, ethylene glycol, neopentyl glycol, 1,4-cyclohexanedimethanol, and diethylene glycol.

19. The process of claim 1 wherein forming the film or sheet is by melt extrusion.

20. The process of claim 1 wherein forming the film or sheet is by cast extrusion.

21. The process of claim 1 wherein inducing crystallization is after step (b) and is by stretching.

22. The process of claim 1 wherein inducing crystallization is after step (b) and is by annealing at a temperature greater than the glass transition temperature of the film and less than melting temperature of the base copolyester.

23. The process of claim 1 wherein forming the sheet and inducing crystallization occur during step (b) by calendering or blown film extrusion.

24. A process for preparing a film or sheet comprising the steps of:
(a) preparing a polyester composition comprising
    (i) about 50 to about 80 weight percent of a base copolyester having a melting temperature of less than about 220° C. and a glass transition temperature of greater than about 60° C. and exhibiting more than about 1 percent crystallinity after annealing for 2000 minutes at a temperature of which the base copolyester has a maximum crystallization rate, and
    (ii) about 20 to about 50 weight percent of a plasticizer suitable for use with the base copolyester,
(b) forming the polyester composition into a film or sheet; and
(c) inducing crystallization during step (b) or after step (b);
and wherein after step (c) the film or sheet has a glass transition temperature below about 23° C. and a melting temperature greater than about 140° C.

25. The process of claim 24 wherein the base copolyester comprises a diacid component comprising residues of at least about 80 mole percent of a primary diacid selected from the group consisting of terephthalic acid, naphthalenedicarboxylic acid, 1,4-cyclohexanedicarboxylic acid, isophthalic acid and mixtures thereof and a diol component comprising residues of about 10 to about 40 mole percent 1,4-cyclohexanedimethanol and about 60 to about 90 mole percent ethylene glycol, based on 100 mole percent of the diacid component and 100 mole percent of the diol component.

26. The process of claim 24 wherein the plasticizer is selected from the group consisting of neopentyl glycol dibenzoate, diethylene glycol dibenzoate, butyl benzyl phthalate; and 2,2,4-trimethyl-1,3-pentanediol monoisbutyrate benzyl phthalate.

27. A film or sheet having a glass transition temperature below about 23° C. and a melting temperature greater than about 120° C. and comprising a polyester composition comprising
(a) about 50 to about 95 weight percent of a base copolyester having a melting temperature of less than about 220° C. and exhibiting more than about 1 percent crystallinity after annealing for 2000 minutes at a temperature of which the base copolyester has a maximum crystallization rate and (b) about 5 to about 50 weight percent of a plasticizer suitable for use with the base copolyester.

28. The film or sheet of claim 27 wherein the base copolyester is present from about 50 to about 80 weight percent and the plasticizer is present from about 20 weight percent to about 50 weight percent.

29. The film or sheet of claim 27 wherein the base copolyester comprises
(i) a diacid component comprising residues of at least about 80 mole percent of a primary diacid selected from the group consisting of terephthalic acid, naphthalenedicarboxylic acid, 1,4-cyclohexanedicarboxylic acid, isophthalic acid and mixtures thereof and
(ii) a diol component comprising residues of at least about 80 mole percent of at least one primary diol containing 2 to about 10 carbon atoms, wherein the diacid component is based on 100 mole percent and the diol component is based on 100 mole percent.

30. The film or sheet of claim 29 wherein the diacid component comprises residues of up to about 20 mole percent of a modifying diacid containing from about 4 to about 40 carbon atoms.

31. The film or sheet of claim 30 wherein the modifying diacid is selected from the group consisting of succinic acid, glutaric acid, adipic acid, suberic acid, sebacic acid, azelaic acid, dimer acid, and sulfoisophthalic acid.

32. The film or sheet of claim 29 wherein the primary diol is selected from the group consisting of ethylene glycol, diethylene glycol, neopentyl glycol, 1,4-cyclohexanedimethanol and mixtures thereof.

33. The film or sheet of claim 29 wherein the primary diol comprises residues of about 10 to 100 mole percent 1,4-cyclohexanedimethanol and 0 to about 90 mole percent ethylene glycol.

34. The film or sheet of claim 33 wherein the primary diol comprises from about 10 to about 40 mole percent 1,4-cyclohexanedimethanol and about 60 to about 90 mole percent ethylene glycol.

35. The film or sheet of claim 29 wherein the diol component comprises residues of up to about 20 mole percent of a modifying diol selected from the group consisting of 1,3-propanediol, propylene glycol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol,1,3-cyclohexanedimethanol, and polyalkylene glycol.

36. The film or sheet of claim 27 wherein the plasticizer dissolves a 5-mil thick film of the base copolyester to produce a clear solution at a temperature below 160° C.

37. The film or sheet of claim 27 wherein the plasticizer has a solubility parameter in the range from about 9.5 to about 13.0 $cal^{0.5}cm^{-1.5}$.

38. The film or sheet of claim 27 wherein the plasticizer is an ester based on
(i) an acid moiety selected from the group consisting of phthalic acid, adipic acid, trimellitic acid, benzoic acid, azelaic acid, terephthalic acid, isophthalic acid, butyric acid, glutaric acid, citric acid and phosphoric acid and
(ii) an alcohol moiety selected from the group consisting of aliphatic, cycloaliphatic, and aromatic alcohols containing from about 1 to about 20 carbon atoms.

39. The film or sheet of claim 38 wherein the alcohol moiety of the plasticizer is selected from the group consisting of methanol, ethanol, propanol, isopropanol, butanol, isobutanol, stearyl alcohol, lauryl alcohol, phenol, benzyl alcohol, ethylene glycol, neopentyl glycol, 1,4-cyclohexanedimethanol, and diethylene glycol.

40. The film or sheet of claim 27 wherein the film or sheet has a glass transition temperature below about 0° C.

41. The film or sheet of claim 40 wherein the film or sheet has a melting temperature greater than about 140° C.

42. The film or sheet of claim 27 wherein the film or sheet has a melting temperature greater than about 140° C.

43. A film or sheet having a glass transition temperature below about 23° C. and a melting temperature greater than about 140° C. and comprising a polyester composition comprising
   (a) about 50 to about 80 weight percent of a base copolyester having a melting temperature of less than about 220° C. and a glass transition temperature of greater than about 60° C. and exhibiting more than about 1 percent crystallinity after annealing for 2000 minutes at a temperature of which the base copolyester has a maximum crystallization rate, and
   (b) about 20 to about 50 weight percent of a plasticizer suitable for use with the base copolyester.

44. The film or sheet of claim 43 wherein the base copolyester comprises a diacid component comprising residues of at least 80 mole percent of a primary diacid selected from the group consisting of terephthalic acid, naphthalenedicarboxylic acid, 1,4-cyclohexanedicarboxylic acid, isophthalic acid and mixtures thereof and a diol component comprising residues of about 10 to about 40 mole percent 1,4-cyclohexanedimethanol and about 90 to 60 mole percent ethylene glycol, wherein the diacid component is based on 100 mole percent and the diol component is based on 100 mole percent.

45. The film or sheet of claim 44 wherein the plasticizer is selected from the group consisting of neopentyl glycol dibenzoate, diethylene glycol dibenzoate, butyl benzyl phthalate; and 2,2,4-trimethyl-1,3-pentanediol monoisobutyrate benzyl phthalate.

* * * * *